(12) United States Patent
Chaudhury

(10) Patent No.: US 12,719,904 B2
(45) Date of Patent: Aug. 25, 2026

(54) DETECTING AND CLASSIFYING SECURITY INTRUSIONS ASSOCIATED WITH CONTAINER ENVIRONMENTS

(71) Applicant: Hewlett Packard Enterprise Development LP, Spring, TX (US)

(72) Inventor: Suporno Chaudhury, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 191 days.

(21) Appl. No.: 18/825,387

(22) Filed: Sep. 5, 2024

(65) Prior Publication Data

US 2025/0379877 A1 Dec. 11, 2025

(30) Foreign Application Priority Data

Jun. 10, 2024 (IN) ............................. 202441044878

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ........................ H04L 63/1425; H04L 63/1416
See application file for complete search history.

(56) References Cited

U.S. PATENT DOCUMENTS 10,027,694 B1 * 7/2018 Gupta ................. H04L 63/1458
10,419,470 B1 * 9/2019 Segev ................. H04L 63/1425
2018/0137093 A1 * 5/2018 Goldfarb ................ G06N 20/10
2019/0011882 A1 * 1/2019 Gusyatin ............ G01N 15/1433
2022/0138321 A1 * 5/2022 Shrestha ............... G06F 16/285 713/187
2022/0210176 A1 * 6/2022 Côté ................... H04L 63/1425
2024/0022600 A1 * 1/2024 Zhang ................. H04L 63/1466
2024/0256659 A1 * 8/2024 Hyder ................... G06F 21/566
2025/0307602 A1 * 10/2025 Ben-Shlomo .......... G06N 3/045
2025/0348399 A1 * 11/2025 Capano ............... G06F 11/3072

OTHER PUBLICATIONS

Grafana Labs, Levan, Michael; "Kubernetes Guide, Kubernetes Layers", "Monitoring Kubernetes layers: Key metrics to know"; Jan. 25, 2023; 12 pp.

(Continued)

*Primary Examiner* — J. Brant Murphy
(74) *Attorney, Agent, or Firm* — Trop, Pruner & Hu, P.C.

(57) ABSTRACT

An apparatus includes an anomaly detection engine, a behavior classification engine and a security intrusion classification engine. The anomaly detection engine monitors a plurality of metrics that are associated with a container environment to detect an anomalous variation of a given metric. The plurality of metrics is associated with a plurality of dimensions. The behavior classification engine, responsive to the detection of the anomalous variation, determines whether the anomalous variation is attributable to a security intrusion or a behavioral anomaly. The security intrusion classification engine, responsive to the determination that the anomalous variation is attributable to the security intrusion, determines feature vectors based on the plurality of metrics and applies a machine learning classifier to the feature vectors to classify the security intrusion.

20 Claims, 8 Drawing Sheets

(56) References Cited

OTHER PUBLICATIONS

IBM, Aggarwal, Charu C.; "High-Dimensional Outlier Detection: The Subspace Method", Chapter 5; T.J. Watson Research Center; Yorktown Heights, New York; First Online: Dec. 13, 2016; pp. 149-184, 36 pp.
Twitter Inc., Hochenbaum, Jordan, et al.; "Automatic Anomaly Detection in the Cloud Via Statistical Learning"; arXiv: 1704.07706v1 [cs.LG] Apr. 24, 2017; 13 pp.

* cited by examiner

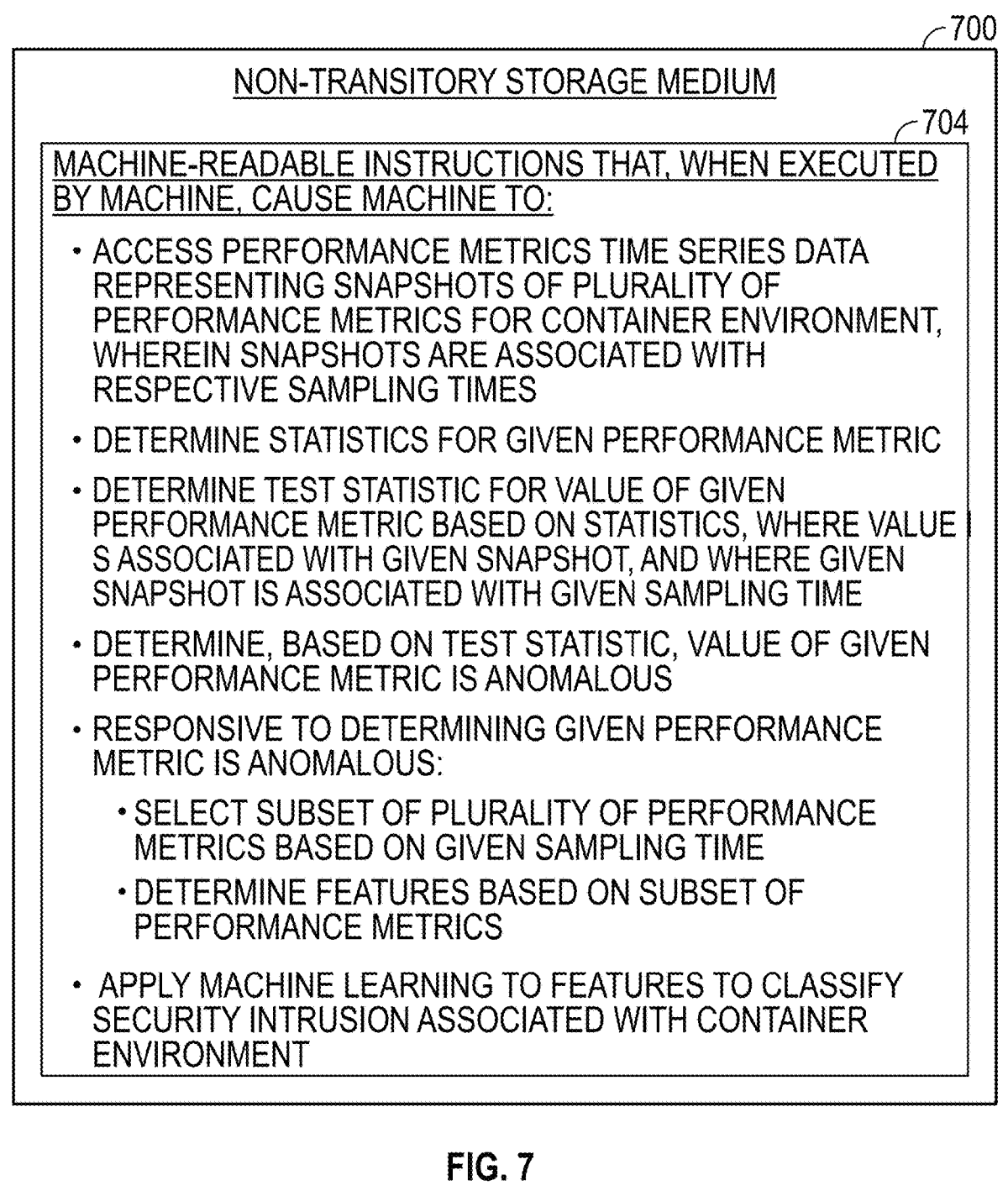

700

NON-TRANSITORY STORAGE MEDIUM

704

MACHINE-READABLE INSTRUCTIONS THAT, WHEN EXECUTED BY MACHINE, CAUSE MACHINE TO:

- ACCESS PERFORMANCE METRICS TIME SERIES DATA REPRESENTING SNAPSHOTS OF PLURALITY OF PERFORMANCE METRICS FOR CONTAINER ENVIRONMENT, WHEREIN SNAPSHOTS ARE ASSOCIATED WITH RESPECTIVE SAMPLING TIMES
- DETERMINE STATISTICS FOR GIVEN PERFORMANCE METRIC
- DETERMINE TEST STATISTIC FOR VALUE OF GIVEN PERFORMANCE METRIC BASED ON STATISTICS, WHERE VALUE I S ASSOCIATED WITH GIVEN SNAPSHOT, AND WHERE GIVEN SNAPSHOT IS ASSOCIATED WITH GIVEN SAMPLING TIME
- DETERMINE, BASED ON TEST STATISTIC, VALUE OF GIVEN PERFORMANCE METRIC IS ANOMALOUS
- RESPONSIVE TO DETERMINING GIVEN PERFORMANCE METRIC IS ANOMALOUS:
  - SELECT SUBSET OF PLURALITY OF PERFORMANCE METRICS BASED ON GIVEN SAMPLING TIME
  - DETERMINE FEATURES BASED ON SUBSET OF PERFORMANCE METRICS
- APPLY MACHINE LEARNING TO FEATURES TO CLASSIFY SECURITY INTRUSION ASSOCIATED WITH CONTAINER ENVIRONMENT

FIG. 7

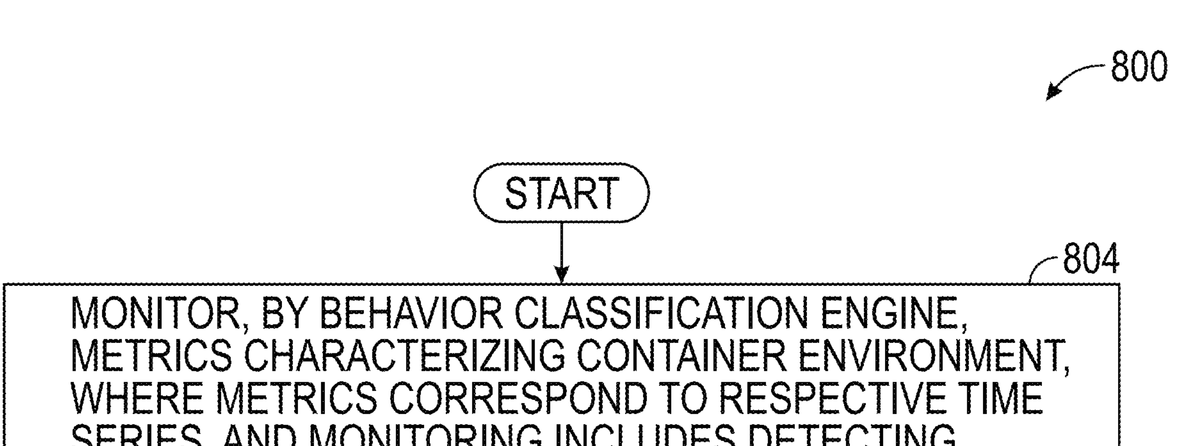

808

RESPONSIVE TO DETECTING UNEXPECTED VALUE:

- DETERMINE, BY BEHAVIOR CLASSIFICATION ENGINE, SET OF MULTI-DIMENSIONAL POINTS ASSOCIATED WITH SPACE, WHERE SPACE IS ASSOCIATED WITH DIMENSIONS AND EACH DIMENSION CORRESPONDS TO DIFFERENT METRIC
- IDENTIFY, BY BEHAVIOR CLASSIFICATION ENGINE, SUBSPACES OF SPACE BASED ON COVARIANCES OF METRICS
- BASED ON CHARACTERISTICS ASSOCIATED WITH SUBSPACES, DETERMINE, BY BEHAVIOR CLASSIFICATION ENGINE, WHETHER UNEXPECTED VALUE IS ATTRIBUTABLE TO CONFIGURATION ISSUE ASSOCIATED WITH CONTAINER ENVIRONMENT OR SECURITY INTRUSION OF CONTAINER ENVIRONMENT

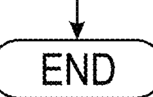

FIG. 8

DETECTING AND CLASSIFYING SECURITY INTRUSIONS ASSOCIATED WITH CONTAINER ENVIRONMENTS

BACKGROUND

A computer system may be subject to a security attack, or intrusion, in which a malevolent actor seeks to access information that is stored in the computer system or harm components of the computer system. A computer system may have various defenses for such purposes as preventing security intrusions, detecting security intrusions and mitigating the degree of harm inflicted by security intrusions.

BRIEF DESCRIPTION OF THE DRAWINGS

FIG. 7 is an illustration of a non-transitory storage medium that stores machine-readable instructions that, when executed by a machine, cause the machine to detect and classify a security intrusion associated with a container environment, according to an example implementation.

FIG. 8 is an illustration of a technique to detect an unexpected value in a performance metric time series associated with a container environment and determine whether the unexpected value is due to a configuration issue or a security intrusion, according to an example implementation.

DETAILED DESCRIPTION

Figure 1:
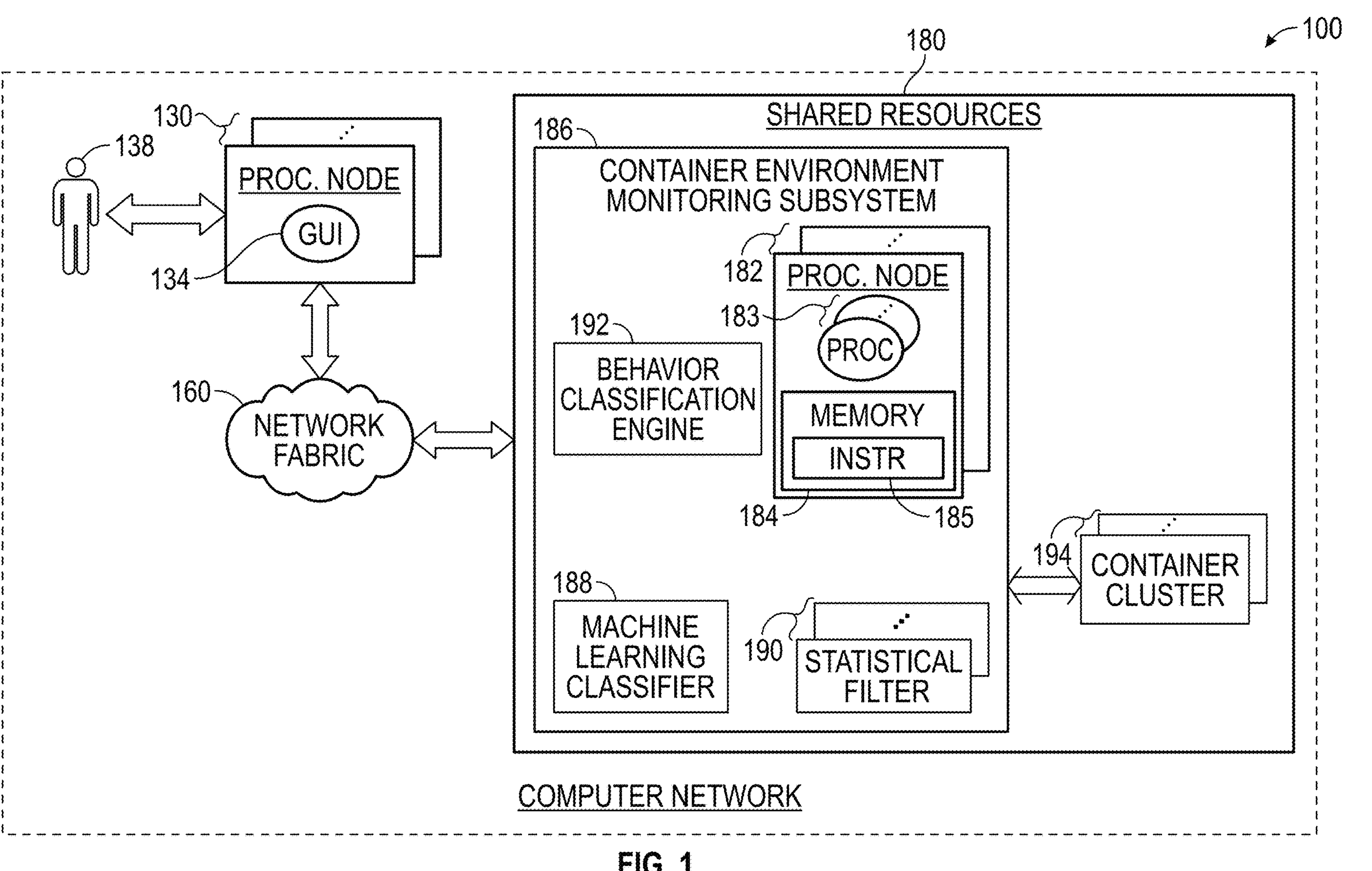
FIG. 1 is a block diagram of a computer network that includes a container environment monitoring subsystem to detect configuration issues and security intrusions associated with a container environment according to an example implementation.

In one type of application architecture, an application may be monolithic and correspond to a single unit. In another type of application architecture, an application may be formed from multiple, autonomous parts called "microservices." As compared to the monolithic architecture, the microservice architecture provides greater agility, elasticity and greater control for software quality assurance. Moreover, the microservice architecture may be better suited for a cloud deployment of an application.

A microservice may be provided by a container environment. In this context, a "container environment" refers to a collection of one or multiple instantiated containers (also referred to herein as "containers"). For a container environment that includes multiple containers, the containers may collaborate for a particular purpose (e.g., providing a microservice). A container environment may be orchestrated or non-orchestrated (or "self-managed"). An orchestrated container environment has an orchestrator that manages the lifecycles and workloads of the environment's containers. In examples, an orchestrator may manage provisioning and resource allocation for the containers. In other examples, an orchestrator may manage container replication, when containers start and stop, container scaling, workload distribution among the containers, or other lifecycle phase or workload aspects of the container environment. In examples, an orchestrated container environment may have a KUBERNETES orchestrator or a DOCKER SWARM orchestrator. In an example, an orchestrated container environment may be a container cluster (e.g., a KUBERNETES cluster) having a control plane and worker nodes. Each worker node for this example may contain one or multiple container pods, where each pod includes multiple containers.

Regardless of its particular form, a container environment may be subjected to a security intrusion. In this context, a "security intrusion," refers to one action or multiple coordinated actions by a malevolent actor for purposes of seeking access to resources or services of the computing environment, or harming the computing environment. A container environment may be monitored for purposes of detecting security intrusions. In this manner, detecting a security intrusion may allow various responsive actions to be undertaken for such purposes as stopping the security intrusion, limiting progress of the security intrusion, isolating external entities from the container environment or mitigating harm inflicted by the security intrusion. Monitoring a container environment to detect security intrusions may, however, be a particularly complex activity.

In one approach, one or multiple neural networks may monitor a container environment for security intrusions. Due to its black box nature, a neural network provides limited information that may be used for purpose of debugging and tuning the neural network. Moreover, neural network complexities may introduce challenges to using neural networks for real time or near real time security intrusion detection. Additionally, approaches to detecting security intrusions in container environments may be premised on all detected container environment abnormalities being attributable to security intrusions and not to other causes. Most container environment abnormalities, however, may be attributable to configuration issues with the container environment, such as configuration changes or code degradation problems. The failure to recognize configuration issues may not only misdirect focus away from the actual root causes of container environment abnormalities but may also waste valuable processing resources and time.

In accordance with example implementations, a container environment monitoring subsystem sorts out configuration issue causes of detected container environment abnormalities from security intrusion causes, which allows the subsystem to focus computationally-intensive processing on classifying actual security intrusions. Consequentially, the container environment monitoring subsystem may detect and classify security intrusions in real time or near real time.

More specifically, in accordance with example implementations, the container environment monitoring subsystem functions as a multi-layer sieve that has upper computationally light layers (i.e., layers that do not perform relatively computationally-intensive processing) to detect container environment abnormalities and classify the abnormalities as being attributable to configuration issues or security intrusions. This computationally light processing allows a deeper and relatively more computationally-intensive machine learning layer of the container environment monitoring subsystem to focus on processing observed container environment features that characterize actual security intrusions. Not only may the container environment monitoring subsystem be particularly adept at detecting and classifying security intrusions in real time or near real time, the container environment monitoring subsystem may also detect configuration issues and security intrusions for a wide range of container environments. These container environments include orchestrated container environments, container clusters, self-managed container environments, container environments that include scratch containers, as well as other container environments.

The container environment monitoring subsystem, in accordance with example implementations, includes a computationally-light first stage, or layer, which is referred to as an "anomaly detection engine" herein. The anomaly detection engine monitors time-varying performance metrics that are provided by a container environment. The time-varying performance metrics characterize different attributes, or characteristics, of the container environment. In examples, the performance metrics may characterize resource consumption, network load, response times, intra-container characteristics, different resources in-use, as well as other aspects of the container environment.

In accordance with example implementations, each time-varying performance metric corresponds to a performance metric time series. In this context, a "time series" refers to a sequence of successive values. The values of a performance metric time series are referred to herein as "observed" values, with the latest (in time) value of a performance metric time series being referred to herein as the most recently observed value (or "current value"). The anomaly detection engine monitors a set of performance metric time series provided by a container environment for purposes of detecting when any of the most recently observed values is unexpected. An unexpected observed value for a performance metric time series is referred to herein as being a "time series anomaly," and the time corresponding to the unexpected observed value is referred to herein as the "time series anomaly detection time."

In an example, the mostly recently observed value of a particular performance metric time series may be considered to be unexpected (also called an "outlier") due to the value being outside of an expected range for the time series. In accordance with example implementations, the anomaly detection engine determines the expected range for a performance metric time series based on statistics of prior observed values of the time series. In an example, the anomaly detection engine may determine the expected range based on a mean and a variance of a set of prior observed values that fall within a moving, or sliding, time window of observed values. As described further herein, in accordance with example implementations, the anomaly detection engine may compensate the time series anomaly detection to account for seasonal influences on the performance metric time series.

The detection of a time series anomaly, in accordance with example implementations, means that the container environment is exhibiting a container environment abnormality. The container environment abnormality may be caused by either a configuration issue (also called a "behavior anomaly" herein) or a security intrusion. Although example implementations are described herein in which the container environment monitoring subsystem detects and responds to a single time series anomaly, a particular security intrusion or configuration issue may result in multiple time series anomalies that occur at or near the same time and are associated with the same container environment abnormality.

When the anomaly detection engine detects a time series anomaly, the anomaly detection engine constructs a set of multi-dimensional data points (called the "points" or "multi-dimensional points" herein) for a second layer, or stage, of the container environment monitoring subsystem to process. The set of multi-dimensional points include performance time series values observed before, at and after the time series anomaly detection time. Each multi-dimensional point is a tuple and is associated with a particular time. Each element of the tuple is a value of a different performance metric time series observed at the associated particular time. Therefore, as an example, a multi-dimensional point A may contain the performance metric values observed at time $T_1$, multi-dimensional point B may contain the performance metric values observed at time $T_2$, and so forth. The second stage, called a "behavior classification engine" herein, processes the multi-dimensional points for purposes of classifying the cause of the time series anomaly, i.e., determining whether the time series anomaly is due to a configuration issue or due to a security intrusion.

If the behavior classification engine determines that the time series anomaly is attributable to a security intrusion, then, in accordance with example implementations, the behavior classification engine asserts a security intrusion indicator to trigger further processing to classify the security intrusion. In accordance with example implementations, a security intrusion classification engine, which is a third stage, or layer, of the container environment monitoring subsystem, derives features from the set of multi-dimensional points and applies a machine learning-based classifier (called a "machine learning classifier" herein) to classify the security intrusion based on the features. If the behavior classification engine determines that the time series anomaly is attributable to a configuration issue, then, in accordance with example implementations, the behavior classification engine instead asserts a behavior anomaly indicator, and the processing of the times series anomaly ends without the security intrusion classification engine being involved.

The behavioral anomaly/security intrusion classification upstream of the security intrusion classification engine may be particularly advantageous for a number of reasons, such as reducing the processing burden that is otherwise imposed on the security intrusion classification engine. In this manner, the resources of the security intrusion classification engine are focused on processing features that actually result from and characterize security intrusions. This allows security intrusions to be detected and classified in real time or near real time. Moreover, the behavioral anomaly/security intrusion upstream of the security intrusion classification engine reduces, if not eliminates, the likelihood that a container environment abnormality due to a configuration issue will be falsely associated with a security intrusion.

FIG. 1 depicts a computer network 100 in accordance with example implementations. Referring to FIG. 1, the computer network 100 includes shared resources 180. In an example, the shared resources 180 are cloud-based resources that are provided by a cloud service provider that provides and manages cloud services over the Internet to customers of the cloud service provider. In another example, the shared resources 180 are located in leased spaces of co-location data center(s), and a business enterprise serves as a provider of service instances for the business enterprise's own use. In another example, a cloud service provider other than a business enterprise owns the shared resources 180 in their own facilities or on properties owned or leased by the business enterprise, and the cloud service operator manages and maintains the shared resources 180 for purposes of providing cloud service instances for the business enterprise.

In accordance with further implementations, the shared resources 180 may be associated with a cloud other than a public cloud or a private cloud. In an example, the shared resources 180 correspond to a community cloud, which provides cloud services for members of a particular community group or members sharing a common interest. In another example, the shared resources 180 correspond to a hybrid cloud, which is a mixture of two or more of a private cloud, public cloud and community cloud.

The shared resources 180 include one or multiple container environments, such as one or multiple container clusters 194 that are depicted in the example implementation of FIG. 1. The shared resources 180 further include one or multiple container environment monitoring subsystems 186. Although depicted in FIG. 1 as monitoring container clusters 194, in general, the container environment monitoring subsystem 186 may monitor a wide variety of container environments, including orchestrated container environments, container clusters, self-managed container environments, container environments that include scratch containers, as well as other container environments.

The container environment monitoring subsystem 186, in accordance with example implementations, monitors performance metrics of a container cluster 194 for purposes of detecting configuration issues (or "behavior anomalies") with the container cluster 194 and detecting security intrusions into the container cluster 194. Although examples are described herein in which the container environment monitoring subsystem 186 detects security intrusions and behavior anomalies for a single container cluster 194, in accordance with further implementations, the container environment monitoring subsystem 186 may monitor performance metric time series for multiple container clusters 194 for purposes of detecting behavior anomalies and security intrusions for the multiple container clusters 194. Moreover, in accordance with further implementations, the container environment monitoring subsystem 186 may detect behavior anomalies and security instructions for container environment(s) other than a container cluster.

In accordance with further implementations, the container environment monitoring subsystem 186 may not be part of the shared resources 180. For example, in accordance with further implementations, the container environment monitoring subsystem 186 may not be cloud-based. In another example, in accordance with yet further example implementations, neither the container cluster(s) 194 nor the container environment monitoring subsystem 186 may be cloud-based. In an example, in accordance with further example implementations, the container environment monitoring subsystem 186 and one or multiple container environments monitored by the subsystem 186, may be part of a private non-cloud computing system, such as a computing system that serves an enterprise.

The container environment monitoring subsystem 186, in accordance with example implementations, includes statistical filters 190 to detect the presence of any anomalies (called "time series anomalies" herein) in a collection of performance metric time series that are provided by a container cluster 194. Each performance metric time series represents a time sequence of samples of a particular performance metric of the container cluster 194.

The statistical filters 190 test respective performance metric time series for purposes of determining when a particular performance metric time series has an unexpected value. When this occurs, the container environment monitoring subsystem 186 constructs a set of multi-dimensional data points (or "points") from the performance metric time series. A behavior classification engine 192 of the subsystem 186 analyzes the multi-dimensional points for purposes of making a determination, or classification, as to whether the times series anomaly is attributable to a configuration issue (or "behavioral anomaly") or is instead attributable to a security intrusion.

For a security intrusion, a machine learning-based classifier 188 (also called a "machine learning classifier 188" herein) of the container environment monitoring subsystem 186 classifies the security intrusion based on features that are derived from the set of multi-dimensional points. In an example, the classification of a security intrusion may include identifying a particular security intrusion goal, or tactic, and identifying one or multiple documented security intrusion techniques to achieve the tactic. As described further herein, in accordance with some implementations, the security intrusion classification may identify a particular security attack that is classified by the MITRE Adversarial Tactics, Techniques and Common Knowledge (or "MITRE ATT&CK") security attack database.

In accordance with example implementations, the container environment monitoring subsystem 186 may initiate one or multiple responsive actions in response to detecting a behavioral anomaly or security intrusion. The particular responsive action(s) that are initiated may depend on a number of factors, such as whether a configuration issue or a security intrusion has been detected; for a security intrusion, a classification of the security intrusion; and one or multiple policies governing responsive actions for the container cluster 194.

In accordance with example implementations, a human user 138 (e.g., a user 138 having the appropriate administrative credentials) may interact with the container environment monitoring subsystem 186 via a dashboard, such as a graphical user interface (GUI) 134. In general, via the GUI 134, a user 138 may monitor and control the container environment monitoring subsystem 186. In this manner, through the GUI 134, a user 138 may perform such actions as selecting a particular container cluster 194 to monitor, selecting a particular container cluster 194 for purposes of viewing performance metrics of the container 134, selecting responsive actions to be undertaken, selecting responsive action policies, selecting the particular performance metrics to be monitored, and so forth. Moreover, via the GUI 134, a user 138 may receive alerts from the container environment monitoring subsystem 186, such as notifications of detected time series anomalies, notifications of detected configuration issues and notifications of detected security intrusions. Additionally, for security intrusions, via the GUI 134, a user 138 may be apprised of the classification of a particular security intrusion, such as the corresponding goal, or tactic, of the security intrusion and one or multiple techniques associated with the tactic.

In accordance with example implementations, the GUI 134 may execute on a processing node 130. In an example, a processing node 130 may be a computer platform. In examples, a computer platform may be a desktop computer, a laptop computer, a tablet computer, smartphone or other hardware processor-based device. The processing nodes 130 may communicate with the shared resources 180 via network fabric 160. In accordance with example implementations, the network fabric 160 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof. In accordance with further implementations, one or multiple GUIs 134 may be provided by the shared resources 180.

Among its other features, the container environment monitoring subsystem 186 may include one or multiple processing nodes 182. In an example, a processing node 182 may be a computer platform, such as a blade server, a rack server or other processor-based electronic device. The processing node 182 includes one or multiple hardware processors 183 and a memory 184. In an example, a hardware processor 183 may include one or multiple central processing unit (CPU) cores and/or one or multiple graphics processing unit (GPU) cores. In another example, a hardware processor 183 may include one or multiple semiconductor CPU packages (or "sockets").

The memory 184 includes non-transitory storage media that may be formed from semiconductor storage devices, memristor-based storage devices, magnetic storage devices, phase change memory devices, a combination of devices of one or more of these storage technologies, and so forth. The memory 184 may represent a collection of memories of both volatile memory devices and non-volatile memory devices.

In an example one or multiple hardware processors 183 on one or multiple processing nodes 182 may execute machine-readable instructions, such as machine-readable instructions 185 that are stored in the memory 184, for purposes of providing one or multiple software components of the container environment monitoring subsystem 186, In examples, the software components may include the machine learning classifier 188, the statistical filters 190, the behavior classification engine 192 and other components that are described herein. In accordance with further implementations, a hardware processor 183 may be a hardware circuit that does not execute machine-executable instructions, such as an application specific integrated circuit (ASIC), field programmable gate array (FPGA), programmable logic device, a programmable logic device (PLD), or other hardware dedicated to providing one or multiple functions for the container environment monitoring subsystem 186.

Figure 2:
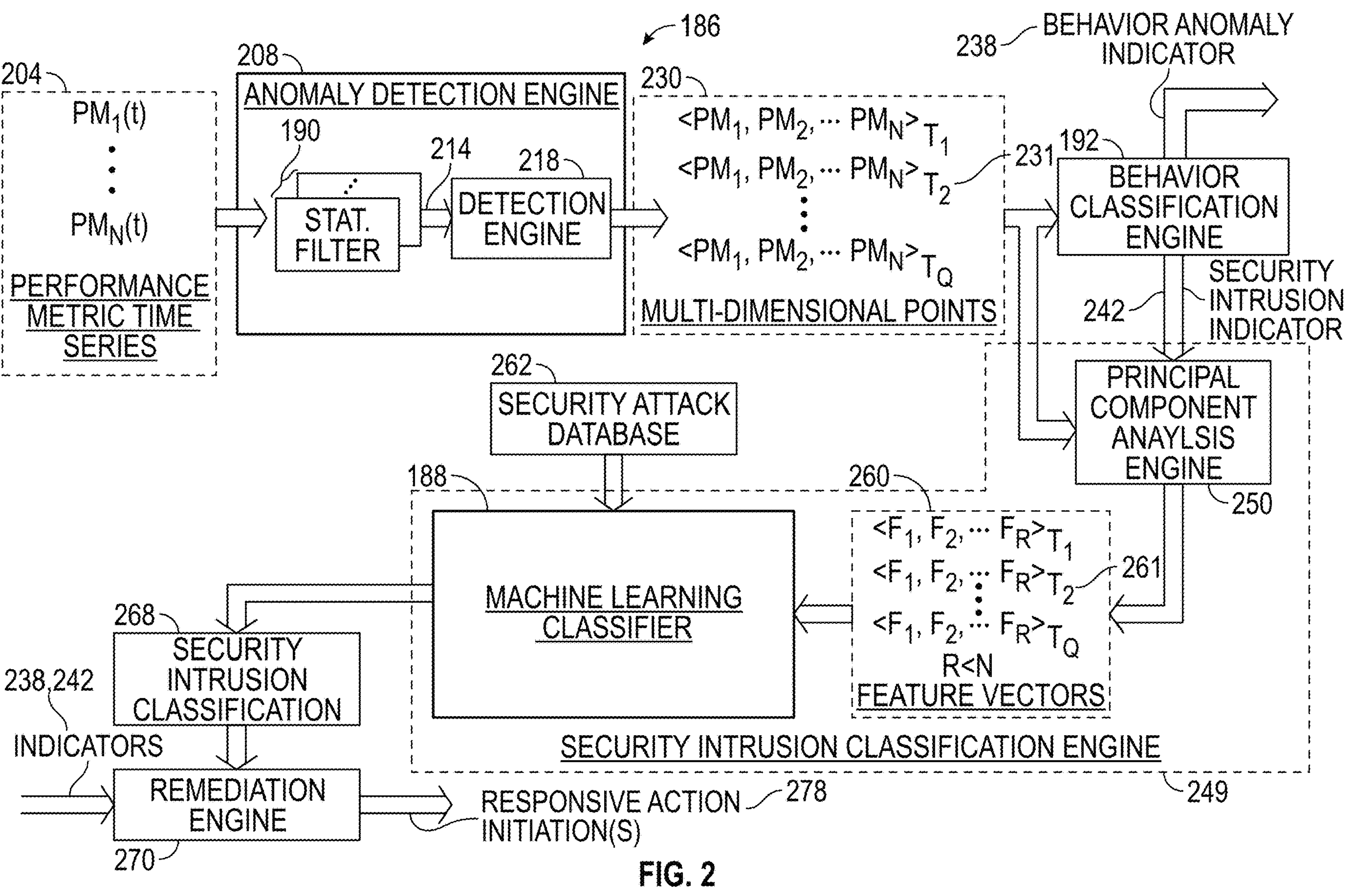
FIG. 2 is a block diagram of the container environment monitoring subsystem of FIG. 1 according to an example implementation.

FIG. 2 is a block diagram of the container environment monitoring subsystem 186, in accordance with example implementations. Referring to FIG. 2, the container environment monitoring subsystem 186 includes an anomaly detection engine 208 that is the first processing stage, or layer, of the subsystem 186. The anomaly detection engine 208 receives a set 204 of time-varying performance metric time series from a container environment (e.g., a container cluster 194 of FIG. 1) for purposes of detecting any time series anomalies in the set 204. A time series anomaly detection by the anomaly detection engine 208 triggers further processing of performance metric data by one or multiple additional layers, or stages, of the container environment monitoring subsystem 186.

In accordance with example implementations, each performance metric time series of the set 204 corresponds to a particular performance metric and is a time sequence of sampled values of the performance metric. For the example implementation that is depicted in FIG. 2, the set 204 includes N performance metric times series $PM_1(t)$ to $PM_N(t)$. With this notation, "t" represents time, "PM(t)" represents a performance metric time series, and the numeric suffix (e.g., the suffix of "1" for "$PM_1(t)$") represents an index corresponding to a specific performance metric time series.

Any of a number of performance metric time series may be monitored by the anomaly detection engine 208, depending on the particular implementation. In an example, the set 204 of performance metric time series may be provided to the anomaly detection engine 208 by a service of the container environment being monitored. In a more specific example, the container environment may be a KUBENETES cluster, and a service of the KUBERNETES cluster may provide time series for corresponding performance metrics called "kube metrics." The kube metrics correspond to different attributes, or characteristics, of components of the cluster, and moreover, the kube metrics may correspond to different layers of the cluster.

In an example, one or multiple performance metric time series represent attributes, or characteristics, of a top cluster layer of a container cluster. In examples, performance metric time series represent utilizations of resources of a container cluster, such as a cluster memory utilization, a cluster central processing unit (CPU) utilization and a cluster disk utilization. In other examples, performance metric time series represent a number of pods of a container cluster, which are running and a number of pods that are unavailable.

One or multiple performance metric time series, in other examples, may represent attributes, or characteristics, of a control plane of a container cluster. In examples, performance metric time series represent numbers of application programming interface (API) requests to respective resources of the container environment. In other examples, performance metric time series represent a total latency of a particular container resource and a latency for scheduling a load on a node. In another example, a performance metric time series represents whether a container cluster has a leader node.

The performance metric time series, in other examples, represent attributes, or characteristics, of container nodes. In an example, a performance metric time series represents a number of containers that are currently running in a particular node. In another example, a performance metric time series represents a latency for a particular runtime operation on a particular node. In other examples, performance metric time series represent network traffic, memory utilization, disk utilization and available disk space for container nodes.

In other examples, performance metric time series represent attributes, or characteristics, associated with a pod of containers, such as the number of requests to an application running in a pod or a utilization of a pod. In other examples, performance metric time series represent attributes, or characteristics, associated with a program that is running inside a pod of a container, such as, for example, a rate of requests to the program or an error rate of the program.

In accordance with example implementations, statistical filters 190 of the anomaly detection engine 208 process respective performance metric time series for purposes of detecting time series anomalies in the respective time series. The statistical filter 190, in accordance with example implementations, applies a statistical test to its respective performance metric time series for purposes of determining whether the most recently observed value of the time series is unexpected (which is referred to herein as being a "time series anomaly"). In an example, a value for a particular performance metric time series may be considered to be a time series anomaly due to the value varying outside of an expected range. The expected range, in accordance with example implementations, may be determined based on statistics gathered from prior observed values of the performance metric time series.

In an example, a normal distribution may be assumed for the respective performance metric time series, and the anomaly detection engine 208 may determine upper and lower boundaries of an expected range based on a mean and a standard deviation of prior observed values of the time series. In an example, for a particular performance metric time series, the anomaly detection engine 208 may determine statistical parameters characterizing values that correspond to a moving, or sliding, time window of M most recently observed values of the time series (excluding, for example, the most recently observed value that is being statistically tested).

A detection engine 218 of the anomaly detection engine 208, in accordance with example implementations, monitors statistical testing result indications 214 by the statistical filters 190. When the indications 214 indicate that a time series anomaly is detected, the detection engine 218 constructs, or assembles, a set 230 of multi-dimensional data points (or "points") that represent potentially relevant information about the time series anomaly. The behavior classification engine 192 processes the set 230 of multi-dimensional points for purposes of classifying whether the time series anomaly is attributable to a configuration issue or is instead attributable to a security intrusion. If the time series anomaly is attributable to a security intrusion, then a security intrusion classification engine 249 of the container environment monitoring subsystem 186 further processes features derived from the set 230 of multi-dimensional points for purposes of classifying the security intrusion. As further described herein, for this purpose, the security intrusion classification engine 249 includes the machine learning classifier 188.

Each multi-dimensional point of the set 230, in accordance with example implementations, is associated with a particular time and is a tuple of performance metric time series values corresponding to that time. As such, each multi-dimensional point, in accordance with example implementations, may be considered a collection, or snapshot, of performance metric values corresponding to a particular observation time. In an example, as depicted in FIG. 2, a particular multi-dimensional point 231 corresponding to time $T_2$ has N elements (corresponding to N performance metric time series) and may be represented as follows:

$$<PM_1, PM_2, \ldots PM_N\rangle_{T2},$$

where "$<PM_1, PM_2, \ldots PM_N>$" represents the tuple of performance metric values, and the suffix "$T_2$" represents the tuple of performance metric values corresponding to a timestamp, or time $T_2$.

The set 230 of multi-dimensional points, in accordance with example implementations, span a range of time. For the example implementation that is depicted in FIG. 2, the set 230 has Q multi-dimensional points, the range of time begins at time $T_1$, and the range of time ends at time $T_Q$. Time $T_1$ is before the time of time series anomaly detection, and time $T_Q$ is after the time of time series anomaly detection. In an example, to construct the set 230 of multi-dimensional points, the detection engine 218 may be programmed with various parameters, In an example, the detection engine 218 may be programmed with configuration parameters to select a first configurable number Y of multi-dimensional points before the time series anomaly detection time and select a second configurable number X of multi-dimensional points after the time series anomaly detection time for purposes of constructing a set 230 that includes Q=X+Y+1 multi-dimensional points. In accordance with further implementations, the detection engine 218 may be configured to select a particular number of multi-dimensional points, including a particular number of points before and after the time series anomaly detection time, based on one or multiple criteria. In another example, the number of points of the set 230 as well as possibly the number of sets before or after the time series anomaly detection time may be based on the number of concurrent or near concurrent time series anomaly detections or other criteria.

The behavior classification engine 192, in accordance with example implementations, processes the set 230 of multi-dimensional points for purposes of determining whether the detected time series anomaly is attributable to a configuration issue (or "behavior anomaly) or attributable to a security intrusion. If the behavior classification engine 192 determines that the time series anomaly is due to a security intrusion, then the behavior classification engine 192 asserts a security intrusion indicator 242. The assertion of the security intrusion indicator 242 triggers further processing of the set 230 of multi-dimensional points for purposes of providing a security intrusion classification 268. If the behavior classification engine 192 determines that the detected time series anomaly is attributable to a behavior anomaly, then the behavior classification engine 192 alternatively asserts a behavior anomaly indicator 238. A remediation engine 278 of the container environment monitoring subsystem 186 responds to the indicator 238 or 242 to initiate one or multiple remedial actions 278 to counter the detected security intrusion or address the detected behavior anomaly.

In accordance with example implementations, the security intrusion classification engine 249 includes a principal component analysis engine 250 and the machine learning classifier 188. The principal component analysis engine 250 identifies principal components of the set 230 of multi-dimensional points. In this context a "principal component" refers to a set of values associated with a particular dimension of the points. For example, the $PM_2$ metric values of the multi-dimensional points of the set 230 may be determined to correspond to a principal component. The principal component analysis engine 250 removes the components of the set 230, which are not identified as being principal components for purposes of transforming the set 230 of multi-dimensional points into a set 260 of feature vectors. The removal of the non-principal components from the set 230 correspondingly reduces the dimensions of the set 230 so that the set 260 of feature vectors has a dimension R that is less than the dimension N of the set 230. The principal components are orthogonal to one another, and removal of the non-principal components assumes that the non-principal components are adequately represented by the principal components.

Therefore, as depicted in FIG. 2, each feature vector is a tuple that has R dimensions, where R is less than N, the dimension of the points of the set 230. The elements of the feature vector are represented by "F" and a suffix corresponding to a dimension index. Moreover, similar to the notation used for the multi-dimensional points of the set 230, the timestamps, or times, for the Q feature vectors 260 are represented by the suffixes $T_1$, $T_2$, TN, and so forth. In an example, feature vector 261, which has a time $T_2$, corresponds to the multi-dimensional point 231 and may be represented as follows:

$$< F_1, F_2, \ldots F_R \rangle_{T2},$$

The machine learning classifier 188, responsive to the behavior classification engine 192 asserting the security intrusion indicator 242, processes the feature vectors 260 for purposes of determining a corresponding security intrusion classification 268. In accordance with example implementations, the machine learning classifier 188 is trained based on information that is contained in a security attack database 262 so that the security intrusion classification 268 represents a particular security intrusion that is identified by the database 262. For example, the security intrusion classification 268 may identify, or represent, a particular goal, or tactic, of a security attack and further represent one or multiple documented specific techniques for achieving the tactic.

Responsive to the detection of a security intrusion, the remediation engine 270 may initiate one or multiple responsive actions. In an example, the remediation engine 270 may initiate a particular responsive action responsive to a security intrusion being detected, regardless of the particular classification of the security intrusion. In another example, the remediation engine 270 may initiate a particular responsive action responsive to a particular security intrusion classification. A "responsive action," for the case of a security intrusion, refers to a measure to address the security intrusion. In an example, a responsive action may include logging the detection of the security intrusion. In another example, a responsive action may include logging a classification of a detected security intrusion. In another example, a responsive action may include shutting down a container environment. In another example, a responsive action may include migrating a container environment to another platform. In another example, a responsive action may include initiating fault tolerant controls to activate an otherwise inactive and redundant container environment to now be an active container environment.

In other examples of responsive actions to security intrusions, a responsive action may include shutting down a worker node, pod or container of a container cluster. In another example, a responsive action may include generating data for purposes of generating an alert for an administrative dashboard. In another example, a responsive action may include sending an alert message to a system administrator. In another example, a responsive action may include sending an alert message to a remote management server. In another example, a responsive action may include quarantining a container environment from a network. In another example, a responsive action may include quiescing operations of a container environment associated with an entity that is external to the container environment. In another example, a responsive action may include scanning one or multiple container images. In accordance with some implementations, the remediation engine may select one or multiple responsive actions for initiation based on a predefined policy that defines responsive actions and criteria for triggering the responsive actions.

In accordance with example implementations, the remediation engine 270 may initiate one or multiple responsive actions responsive to the detection of a configuration issue, or a behavior anomaly. In an example, a responsive action may include logging the detection of the behavior anomaly. In another example, a responsive action may include shutting down a container environment. In another example, a responsive action may include alerting an administrator to the behavior anomaly. In another example, a responsive action may include sending an alert message to a remote management server. In other examples, responsive actions may include quarantining a container environment from a network, quiescing operations of a container environment associated with an entity that is external to the container environment, or one or multiple other actions. In accordance with some implementations, in response to a behavior anomaly, the remediation engine may select one or multiple responsive actions for initiation based on a predefined policy that defines responsive actions and criteria for triggering the responsive actions.

Figure 3:
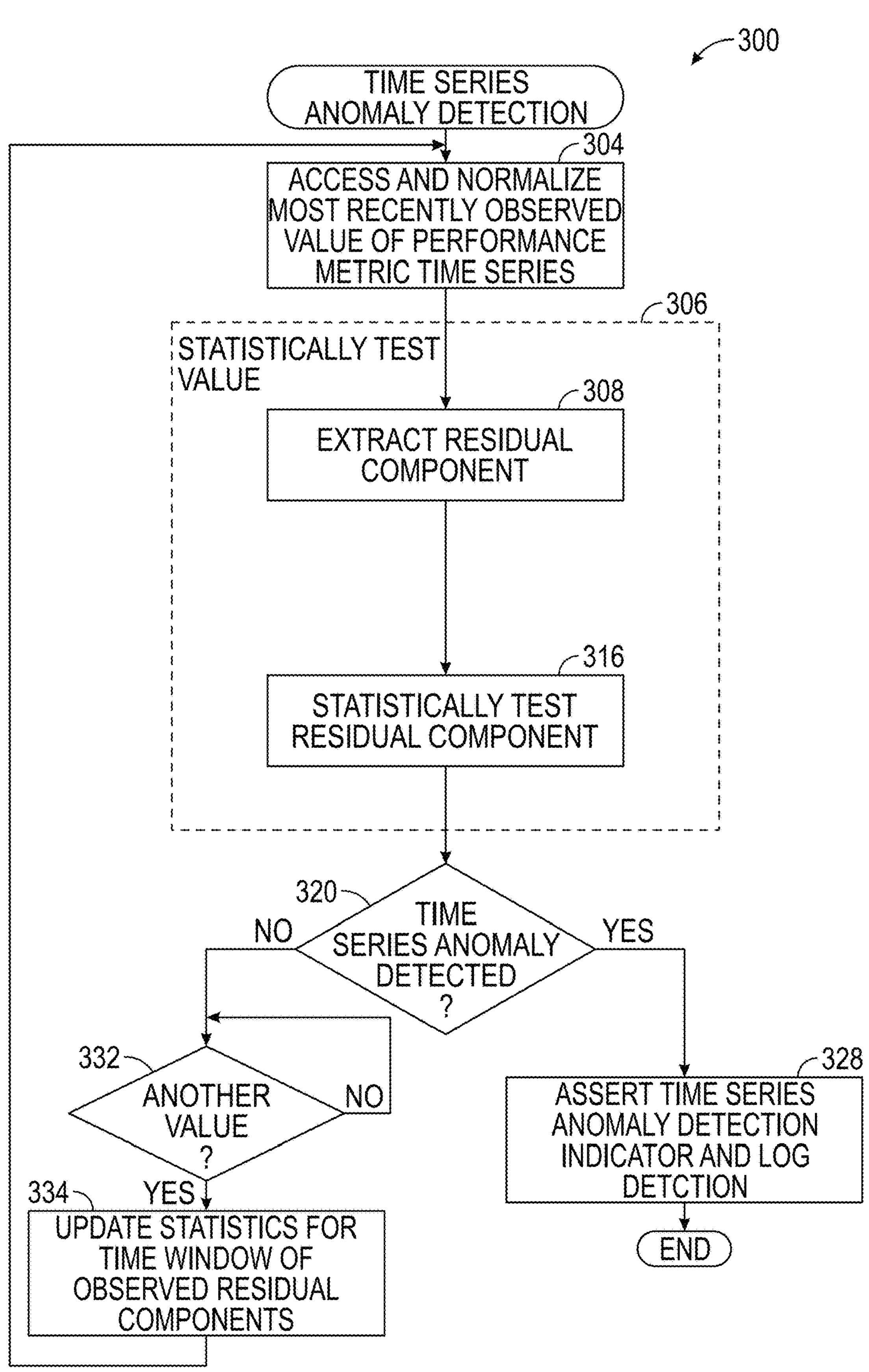
FIG. 3 is a flow diagram depicting a technique used by a time series anomaly detection engine of FIG. 2 to detect and respond to a time series anomaly according to an example implementation.

In accordance with example implementations, an anomaly detection engine, such as the anomaly detection engine 208 of FIG. 2, may use a technique 300 that is depicted in FIG. 3 for purposes of detecting and responding to a time series anomaly in a performance metric time series.

Referring to FIG. 3, the technique 300 includes, pursuant to block 304, the anomaly detection engine accessing and normalizing the most recently observed value of the performance metric time series. In an example, the normalization may include taking into account the potential maximum and minimum values for the performance metric time series. The normalization, in general, ensures that all of the observed values for the performance metric time series are within a particular range of values. In an example, the range may be between −1 and 1. In another example, the range may be between 0 and 1.

The anomaly detection engine statistically tests the most recently observed value, as depicted at 306. In an example, the statistical testing may assume that the observed values of the performance metric time series follow a particular statistical distribution, such as a normal distribution, and the statistical testing, for the assumed statistical distribution, determines statistics based on the observed values. In an example, block 306 may include determining statistics for the performance metric time series based on a moving, or sliding, time window (e.g., the prior M observed values) of observed values.

In an example, the anomaly detection engine may statistically test the most recently-observed and normalized value by applying a Grubbs' statistical test for purposes of determining whether a Grubbs' test statistic exceeds a maximum Grubbs' threshold or is below a minimum Grubbs' threshold (and is therefore, considered to be anomalous). In another example, the statistical testing of the most recently observed value may include applying a z-score statistical test for purposes of determining whether a z-score test statistic exceeds a maximum z-score threshold or is below a minimum z-score threshold. In another example, block 306 may include applying an Extreme Studentized Deviate (ESD) algorithm for purposes of determining a test statistic for the k most extreme observed values and comparing the test statistic to a threshold that is calculated from the remaining observed values. The test statistic is calculated based on the mean and standard deviation of the k most extreme observed values.

In accordance with example implementations, the statistical testing of block 306 accommodates seasonal influences on the performance metric time series. More specifically, in accordance with example implementations, the statistical testing accounts for the performance metric time series having a seasonal component. In this context, a "seasonal component" of a performance metric time series refers to a contribution to the time series, which has a predictable timing. In examples, a seasonal component may be a contribution to the performance metric time series, which occurs on holidays, at certain times during the day, at certain days of the week, at certain days of the calendar year, or occurs according to another predictable schedule. In a more specific example, a performance metric time series may correspond to a time sequence of memory utilization values of a particular container pod. The container pod may, for example, correspond to a microservice to provide a front-end interface for an e-commerce web server, and the web server may serve customers within a particular geographical region. In an example, in the absence of any security intrusion or configuration issues, the memory utilization may be expected to be relatively lower than average during certain hours (e.g., midnight until 7:00 AM) due to less consumer use of the e-commerce web server. In another example, the memory utilization may be expected to be relatively higher than average for certain days (e.g., every Monday or the Monday after Thanksgiving in the United States).

In accordance with example implementations, the statistical testing of block 306 assumes that a given performance metric time series has three components: a seasonal component, a trend component and a residual component. In this context, a "trend component" of a time series refers to a contribution to the time series, which is a general change for the time series. In an example, a trend may be a gradual increase in e-commerce transactions over time, resulting in, for the example above, a general time rate of increase in the memory consumption of the pod in the foregoing example.

As depicted in FIG. 3, in accordance with example implementations, the statistical testing of block 306 includes extracting (block 308) the residual component (the "most recently observed residual component") from the most recently observed value and statistically testing (block 316) the residual component. In an example, block 308 includes decomposing the time series into seasonal, trend and residual components. In an example, block 306 may include applying a Seasonal ESD (S-ESD) algorithm, which includes determining a test statistic for the k most extreme observed residual values and comparing the test statistic to a threshold that is calculated from the remaining observed residual values. In another example, block 306 includes applying a Seasonal Hybrid Extreme Studentized Deviate (S-H-ESD) algorithm, which is similar to the S-ESD algorithm, except that for the S-H-ESD algorithm, the test statistic is calculated based on the median and the median absolute deviation of the k most extreme residual values (instead of being calculated from the mean and standard deviation of the k most extreme residual values).

Pursuant to decision block 320, the anomaly detection engine determines whether a time series anomaly has been detected. If not, then, as depicted at 332, the technique 300 may wait for the next observed value for the performance metric time series, and when this occurs, update (block 334) the statistics for the time window of observed residual components before control returns to block 304. Otherwise, if a time series anomaly is detected, the anomaly detection engine asserts (block 328) a time series anomaly indicator and logs the detection. The assertion of the anomaly detection indicators triggers the construction of a set of multi-dimensional points for further processing for behavior anomaly/security intrusion classification, as discussed further below in connection with FIG. 4. Moreover, the assertion of the time series anomaly detection indicator triggers the extraction of feature vectors from the set of multi-dimensional points and the classification of the security intrusion based on the feature vectors, as discussed further below in connection with FIG. 5.

Figure 4:
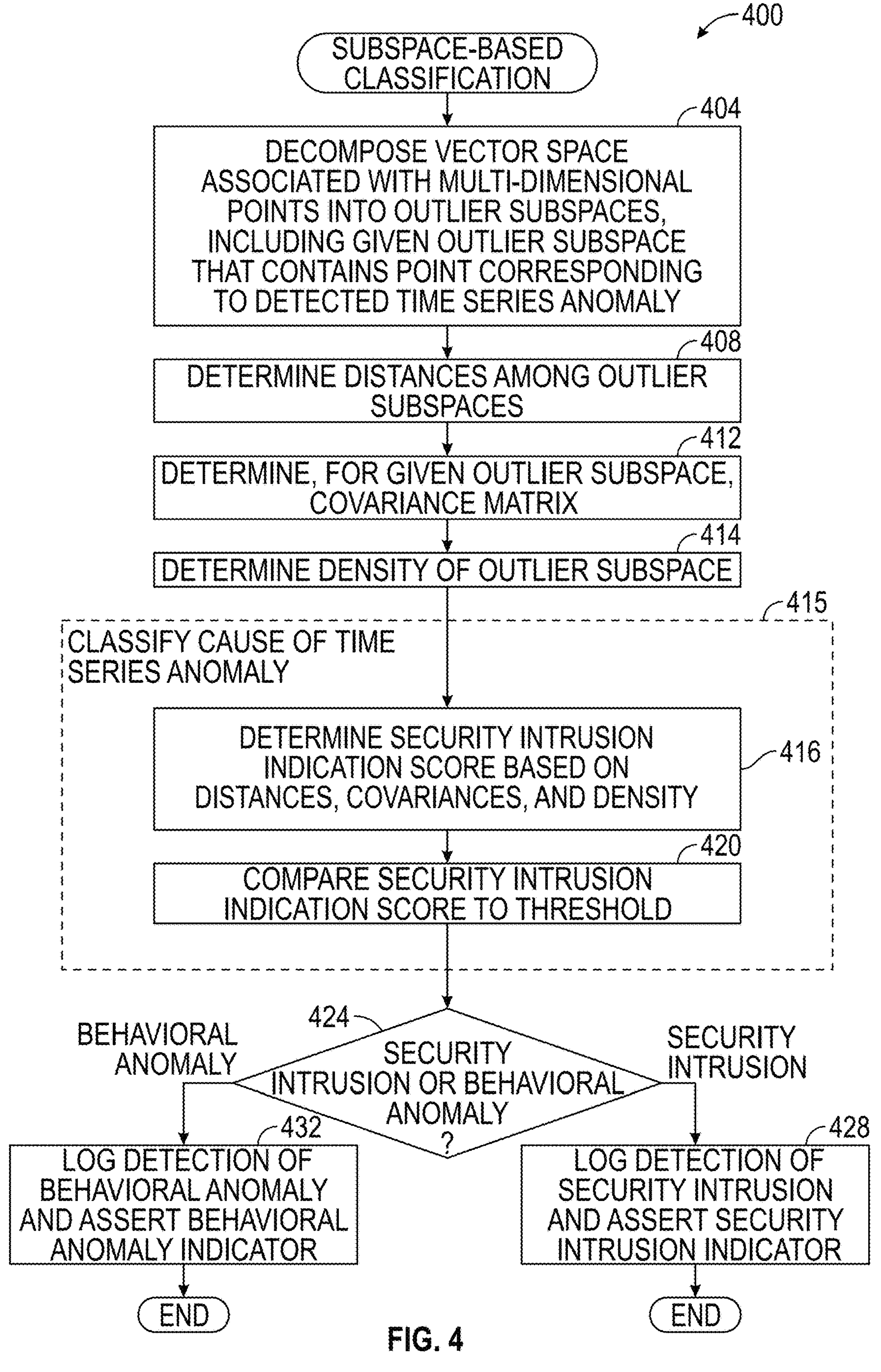
FIG. 4 is a flow diagram depicting a technique used by a behavior classification engine of FIG. 2 to classify a cause of a detected time series anomaly according to an example implementation.

In accordance with example implementations, a behavior classification engine, such as the behavior classification engine 192 of FIG. 2, may use a technique 400 that is depicted in FIG. 4 for purposes of classifying whether a time series anomaly is attributable to a security intrusion or a behavior anomaly.

Referring to FIG. 4, the technique 400 determines whether a time series anomaly is attributable to a security intrusion or a behavior anomaly by analyzing outlier subspaces of the multi-dimensional points (e.g., the set 230 of multi-dimensional points of FIG. 2). More specifically, the points are associated with an N-dimensional space (e.g., a linear vector space). Outliers in the N-dimensional space may be easier to recognize when subspaces (called "outlier subspaces") of the N-dimensional space are identified. Accordingly, pursuant to block 404, the behavior classification engine may decompose the vector space associated with the multi-dimensional points into outlier subspaces. In an example, the decomposition may involve the behavior classification engine applying a subspace outlier detection (SOD) algorithm. One of these outlier subspaces is associated with the time series anomaly, as the outlier subspace includes a multi-dimensional point that, in turn, includes the performance metric value that corresponds to the detected time series anomaly.

In accordance with example implementations, the behavior classification engine analyzes characteristics, or attributes, of the outlier subspaces for purposes of determining whether the time series anomaly is attributable to a security intrusion or a behavior anomaly. Any of a number of attributes, or characteristics, of the outlier subspaces may be considered by the behavior classification engine for purposes of classifying the cause of the time series anomaly, depending on the particular implementation. As depicted in FIG. 4, in accordance with some implementations, pursuant to block 408, the behavior classification engine determines distances among outlier detection subspaces. In an example, for two subspaces that have the same dimensions, the distance between the subspaces is the Grassmannian distance. In another example, for two outlier subspaces that have different dimensions, the distance between the subspaces is the distance of a point (corresponding to one subspace) of the Grassmannian to a Schubert variety (corresponding to the other subspace) within the Grassmannian. In general, relatively large distances among the outlier subspaces are indicative of a security intrusion, and conversely, relatively smaller distances among outlier subspaces are indicative of a behavior anomaly (or configuration issue).

The behavior classification engine may further determine attributes of the given outlier subspace that corresponds to the detected time series anomaly for purposes of classifying the time series anomaly. In accordance with some implementations, the behavior classification engine determines performance metric covariances for the given subspace. More specifically, as depicted in FIG. 4, in accordance with some implementations, the behavior classification engine, pursuant to block 412, determines, for the given outlier subspace, a covariance matrix for the multi-dimensional points within the outlier subspace. In an example, each element of the covariance matrix may be within a range of −1 to 1 and represents the covariance between a pair of performance metrics (and correspondingly a covariance between two dimensions). Due to the nature of the covariance matrix, some elements correspond to the same performance metric and have a covariance of "1." The behavior classification engine may, pursuant to block 412, evaluate each dimension of the covariance matrix for purposes of determining whether the dimension has associated relatively large covariances. In an example, the behavior classification engine determining whether certain pairs of covariances are considered large may include comparing the covariances to historical covariances. In another example, the behavior classification engine may determine whether a covariance for a certain pair of dimensions is large by comparing the covariance with a covariance threshold. In accordance with example implementations, a relatively large number (e.g., a number that corresponds to a number threshold) of relatively large covariances is consistent with a security intrusion.

Pursuant to block 414, the behavior classification engine may also determine the point density of the given outlier subspace that corresponds to the time series anomaly. In an example, block 414 may include comparing the determined density to a threshold density (e.g., a density derived from historical data) for purposes of determining whether the density is considered relatively sparse. In general, a relatively sparse density for the given outlier subspace is consistent with a security intrusion.

Pursuant to block 415, the behavior classification engine classifies the time series anomaly based on the determined distances, covariances and density. In an example, pursuant to block 415, the behavior classification engine may classify the time series anomaly as being attributable to a configuration issue if the variance in one dimension of the given outlier subspace is relatively large, but the variances in the other dimensions of the given outlier subspace are consistent with historical variances. In another example, the behavior classification engine may, pursuant to block 415, classify the time series anomaly as being attributable to a security intrusion if the distances between the outlier subspaces are relatively large; the variances of the given outlier subspace are relatively large; and the datapoint density of the given outlier subspace is relatively small.

In accordance with example implementations, the behavior classification engine classifies the time series anomaly based on a determined score. More specifically, as depicted in block 416, the behavior classification engine determines a security intrusion score and compares, as depicted in block 420, the security intrusion to a score. As depicted in block 416, in an example, the behavior classification engine may determine the security intrusion indication score based on the determined distances, covariances and density.

The security intrusion indication score may have any of a number of different components, depending on the particular implementation. In an example, the security intrusion indication score may include a first component (e.g., a mean distance) that represents the distances among the outlier subspaces. In an example, the security intrusion indication score may further include a second component that represents whether the covariances in the outlier subspace that contains the datapoint corresponding to the time series anomaly are relatively large (as compared to historical covariances) in one dimension or are relatively large (as compared to historical covariances) in a number of dimensions. For example, the second component may correspond to a value that is relatively low for large covariances limited to one dimension and increases with the number of dimensions that have large covariances. In another example, the security intrusion score may further include a third component that inversely varies with respect to the datapoint density of the given outlier subspace.

For the foregoing example, the security intrusion score is larger for security intrusions and smaller for configuration issues (or behavioral anomalies). In an example, for a security intrusion score that increases with a security intrusion, block 420 may include determining whether the score surpasses a threshold (to indicate a security intrusion) or is otherwise indicative of a behavioral anomaly. In another example, the security intrusion indication score may vary in the opposite manner, such that the security intrusion score is smaller for a security intrusion and larger for a configuration issue.

In another example, the behavior classification engine may determine a security intrusion indication score by assigning different weights to score components to selectively prioritize the components and comparing a summation of the weighted score components to a threshold. In another example, the behavior classification engine may determine a security intrusion indication score based on more than three score components or less than three score components.

Regardless of the particular methodology used by the behavior classification engine to classify the cause of the time series anomaly, as depicted at decision block 424, the behavior classification engine takes different actions depending on the classification. If, pursuant to decision block 424, the behavior classification engine determines that the time series anomaly is due to a security intrusion, then, pursuant to block 428, the behavior classification engine logs the detection of the security intrusion and asserts a security intrusion indicator. The assertion of the security intrusion indicator triggers further processing of the multi-dimensional points by a machine classifier, as further described below in connection with FIG. 5. If, however, pursuant to decision block 424, the behavior classification engine determines that a behavior anomaly caused the time series anomaly, then, pursuant to block 432, the behavior classification engine logs the detection of the behavior anomaly and asserts a behavioral anomaly indicator. The assertion of the behavioral anomaly indicator, in accordance with example implementations, triggers the initiation of one or multiple responsive actions to address the behavioral anomaly.

Figure 5:
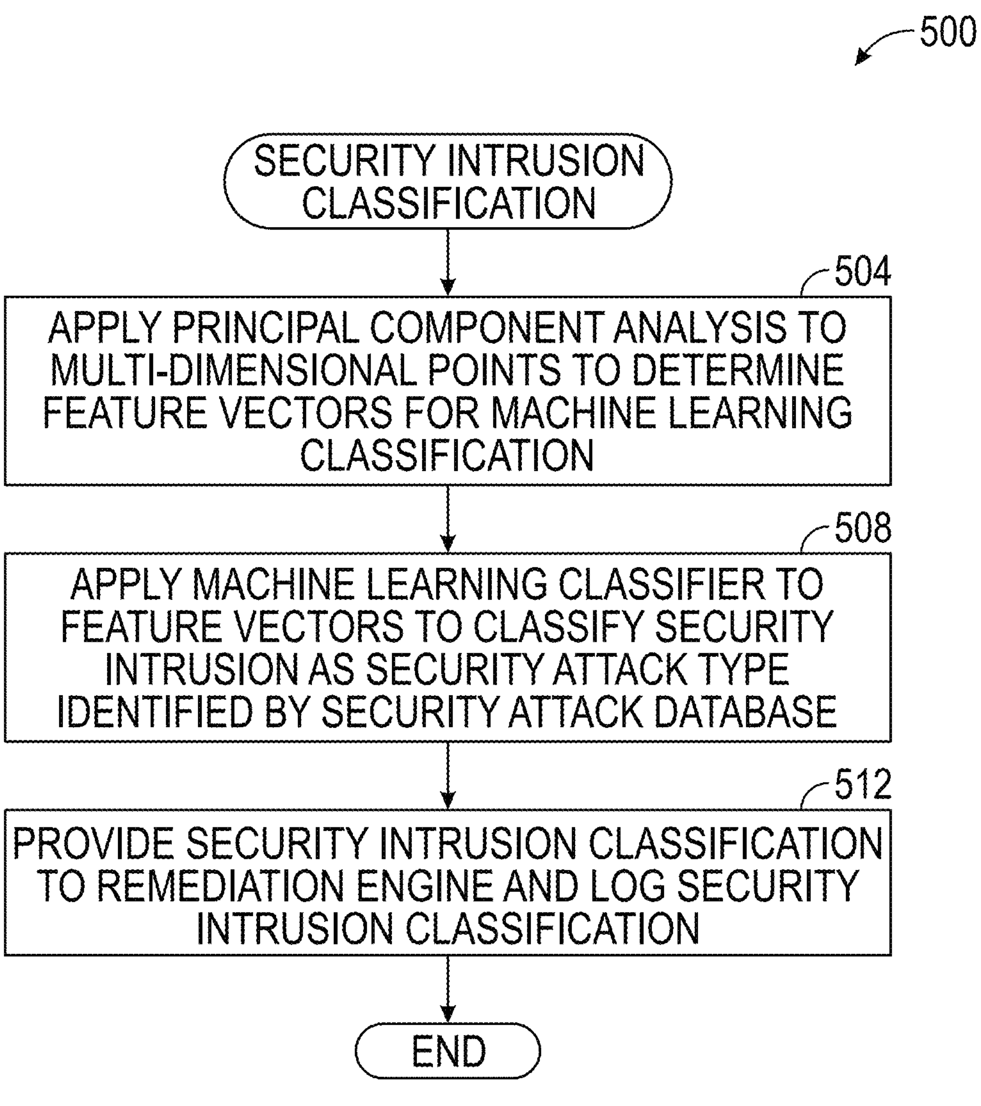
FIG. 5 is a flow diagram depicting a technique used by a security intrusion classification engine of FIG. 2 to classify a security intrusion according to an example implementation.

In accordance with example implementations, a security intrusion classification engine, such as the security intrusion classification engine 249 of FIG. 2, may use a technique 500 that is depicted in FIG. 5 responsive to a security intrusion being the cause of a time series anomaly.

Referring to FIG. 5, the security intrusion classification engine, pursuant to block 504, applies a principal component analysis to the multi-dimensional points to extract features from the points, which are used to classify the security intrusion. The principal component analysis eliminates certain dimensions associated with the multi-dimensional datapoints for purposes of deriving feature vectors of a smaller dimension space. In general, principal component analysis is a statistical technique to reduce the number of dimensions of features considered by a machine learning algorithm while preserving variance of the features.

In accordance with example implementations, the security intrusion classification engine, pursuant to block 504, transforms a set of possibly correlated variables into a set of linear correlated variables that correspond to principal components (which correspond to principal dimensions). In an example, the principal component analysis includes determining, from the multi-dimensional points, a covariance matrix, which represents covariances between different pairs of dimensions. If the values in one dimension strongly vary with respect to the values in another dimension, then the principal component analysis includes removing one of these dimensions, as the values of the removed dimension are adequately represented by the values in the non-removed dimension. In an example, two dimensions are considered to be strongly correlated if the corresponding covariance exceeds a covariance threshold. For example, the principal component analysis removes one of the dimensions if the covariance is above the covariance threshold.

In accordance with example implementations, the principal component analysis is an orthogonal transformation. The first principal component resulting from the analysis accounts for the largest possible variance, and each succeeding component produced by the analysis, in turn, has the highest variance possible under the constraint that the component is orthogonal to each of the other principal components. As a result of the principal component analysis, the dimensions of the feature vector are less in number than the dimensions of the datapoint.

The security intrusion classification engine, pursuant to block 508, applies a machine learning classifier to the feature vectors for purposes of classifying the security intrusion as being a documented security attack type identified by a security attack database. In an example, the security attack database may be the MITRE ATT&CK database that contains data representing tactics, or goals, of known security intrusions and documented techniques to achieve these goals. Moreover, the MITRE ATT&CK database is organized for different computing environments, such as enterprise computing systems, industrial control systems and mobile systems. In examples, the MITRE ATT&CK database contains identification (ID) numbers corresponding to a wide variety of tactics, such as running malicious code, trying to get into network, privilege escalation, stealing account information and password, and so forth. Each tactic may be achieved by a number of documented techniques, and the MITRE ATT&CK database assigns ID numbers to the techniques. The MITRE ATT&CK database may further decompose a given technique into possible sub-techniques that are assigned sub-technique ID numbers. Accordingly, a specific security intrusion may be associated with a particular tactic, one or multiple techniques and one or multiple sub-techniques of the MITRE ATT&CK database, and the tactic, technique(s) and sub-technique(s) may be identified by corresponding ID numbers.

In accordance with further implementations, the security attack database may not be a MITRE ATT&CK database. For example, the security attack database may provide documentation of security attack knowledge acquired by a particular enterprise or shared within a particular community.

In an example, the machine learning classifier may correspond to an ensemble learning-based classification algorithm. With ensemble learning, multiple machine learning models are combined to produce a single model for the classification. In a more specific example, in accordance with some implementations, the machine learning classifier may use a gradient boosting algorithm, such as an extreme Gradient Boosting (or "XGBoost") algorithm. The XGBoost algorithm builds decision trees sequentially. Each decision tree tries to correct the error(s) in the prediction made by the previous decision tree. The sequence of building the decision trees continues until a predefined maximum number of decision trees is reached, the decision trees collectively make predictions with no error, the error(s) are within goals, or some other criteria.

In an example, the XGBoost algorithm may be trained using a form of unsupervised machine learning in which the XGBoost algorithm processes training data corresponding to different feature vector sets to derive a set of classifications. This set of classifications may then be mapped to different security intrusions that are defined in the security intrusion database. Therefore, after the training phase, the machine classifier is configured to classify a particular set of feature vectors as corresponding to a particular security intrusion, such as a particular security intrusion tactic, as well as one or multiple security intrusion techniques and potentially one or multiple sub-techniques.

The machine learning classifier may use a classification algorithm other than an XGBoost algorithm, in accordance with further implementations. For example, in accordance with further implementations, the machine classifier may use a machine learning classification algorithm based on a random forest model, a naive Bayes model, a k-nearest neighbors model, a neural network or other machine learning model.

The security intrusion classification engine, pursuant to block 512, provides a security intrusion classification and logs the security intrusion classification. In an example, the particular security intrusion classification may serve as an input to a remediation engine for purposes of selecting and initiating the appropriate responsive action(s) to counter the security intrusion corresponding to the particular security intrusion classification.

Figure 6:
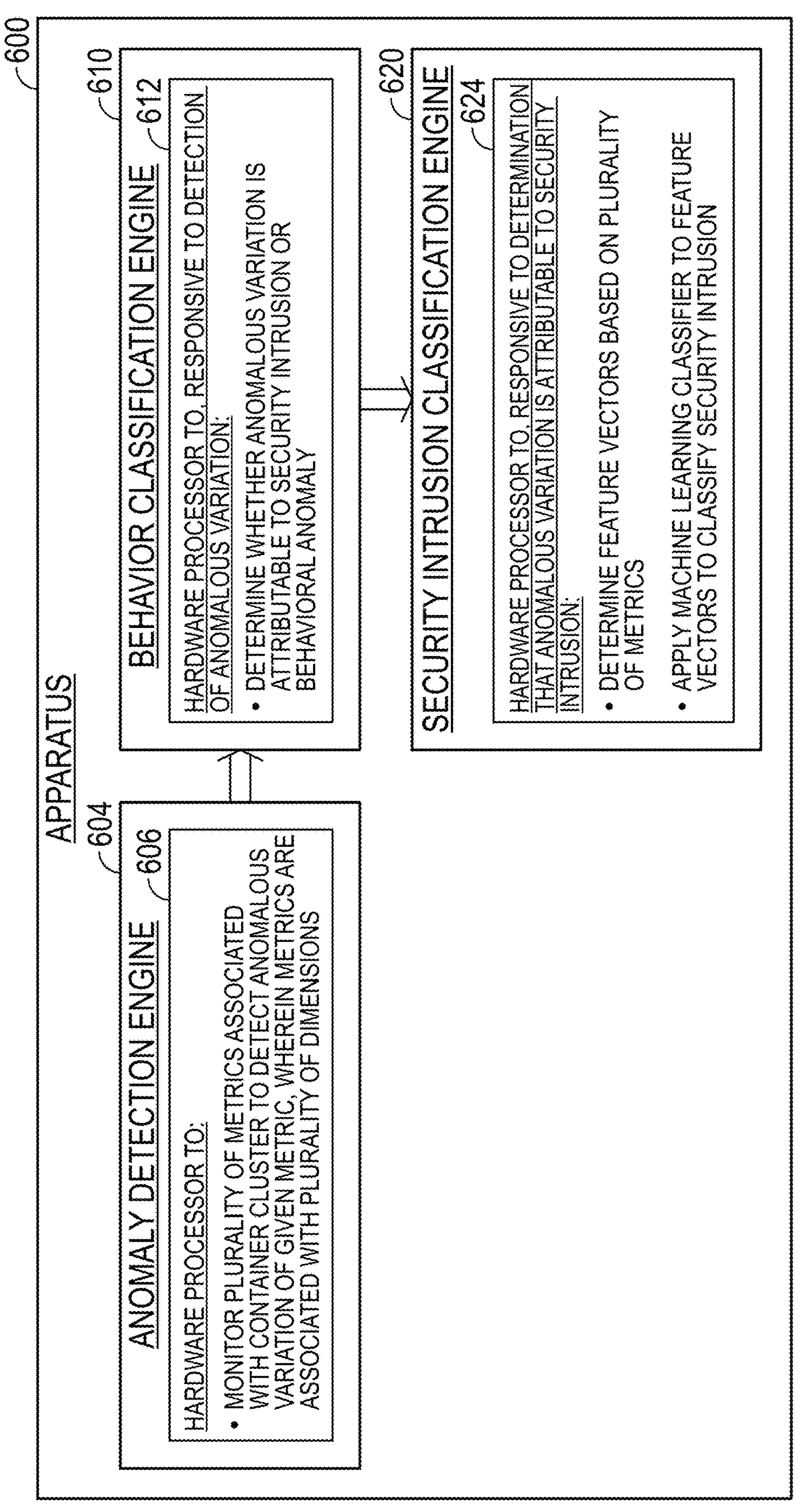
FIG. 6 is a block diagram of an apparatus to detect and classify a security intrusion associated with a container cluster according to an example implementation.

Referring to FIG. 6, in accordance with example implementations, an apparatus 600 includes an anomaly detection engine 604, a behavior classification engine 610 and a security intrusion classification engine 620. In an example, the apparatus 600 is a container environment monitoring subsystem, which detects behavior anomalies and security intrusions associated with a container environment. In examples, the behavior anomaly may be due to a configuration issue with the container environment, such as a configuration change, a code degradation or other configuration-affiliated reason. In an example, the container environment is an orchestrated container environment, a self-managed container environment, or a container environment that includes one or multiple scratch containers. In an example, the container environment is a KUBERNETES cluster. In an example, the security intrusion is a security intrusion that is recognized by a security attack database, such as the MITRE ATT&CK database.

The anomaly detection engine 604 includes a hardware processor 606, the behavior classification engine 610 includes a hardware processor 612, and the security intrusion classification engine 620 includes a hardware processor 624. In an example, a hardware processor includes one or multiple CPU cores. In another example, a hardware processor includes one or multiple GPU cores. In another example, a hardware processor includes one or multiple semiconductor CPU packages, or sockets. In another example, a hardware processor includes a hardware circuit that does not execute machine-executable instructions, such as an ASIC, an FPGA or a PLD.

The hardware processor of the anomaly detection engine monitors a plurality of metrics associated with a container cluster to detect an anomalous variation of a given metric. The plurality of metrics is associated with a plurality of dimensions. In an example, the metrics may be performance metrics. In an example, the metrics are kube metrics that are provided by a service of a KUBERNETES cluster. In an example, the metrics correspond to multiple performance metric time series. In an example, the performance metrics represent one or multiple characteristics of a top cluster layer of the container cluster. In an example, the performance metrics represent attributes, or characteristics, of a control plane of the container cluster. In an example, the performance metrics represent attributes, or characteristics, of nodes of the container cluster. In an example, the performance metrics represent attributes, or characteristics, associated with a pod of containers. In another example, the performance metrics represent attributes, or characteristics, associated with a program that is running inside a pod of a container.

The hardware processor 612 of the behavior classification engine 610, responsive to the detection of the anomalous variation, determines whether the anomalous variation is attributable to a security intrusion or attributable to a behavioral anomaly. In an example, the behavior classification engine 610 makes the determination based on one or multiple attributes, or characteristics, of outlier subspaces. In an example, the behavior classification engine 610 decomposes a vector space corresponding to the metrics into outlier subspaces. In an example, the behavior classification engine 610 evaluates distances among the outlier subspaces. In an example, the behavior classification engine 610 evaluates a density of the outlier subspace that is associated with the anomalous variation. In an example, the behavior classification engine 610 considers dimensional covariances of the outlier subspace corresponding to the anomalous variation. In an example, the behavior classification engine 610 classifies the anomalous variation as being attributable to a security intrusion or a behavior anomaly based on a score that is derived from evaluation of the outlier subspaces.

The hardware processor 624 of the security intrusion classification engine 620, responsive to the determination that the anomalous variation is attributable to a security intrusion, determines feature vectors based on the plurality of metrics. The hardware processor 624 applies a machine learning classifier to the feature vectors to classify the security intrusion. In an example, determining the feature vectors includes applying a principal component analysis to identify principal components of the plurality of metrics. In an example, the principal component analysis analyzes multi-dimensional points corresponding to the plurality of metrics for purposes of reducing the dimension associated with the points to a reduced dimension set of points corresponding to the feature vectors. In an example, the machine learning classifier corresponds to an ensemble learning-based classification algorithm. In an example, the machine learning classifier corresponds to a gradient boosting algorithm. In an example, the machine learning classifier may be an XGBoost algorithm. In an example, classifying the security intrusion includes identifying a security tactic and one or multiple techniques to achieve the tactic. In an example, classifying the security intrusion includes identifying an intrusion that is recognized by the MITRE ATT&CK security database.

Referring to FIG. 7, in accordance with example implementations, a non-transitory storage medium 700 store machine-readable instructions 704. The instructions 704, when executed by a machine, cause the machine to access performance metrics time series data representing snapshots of a plurality of a performance metrics for a container environment. The snapshots are associated with respective sampling times. In examples, the container environment may be an orchestrated container environment, a self-managed container environment, or a container environment that includes one or multiple scratch containers. In an example, the container environment is a KUBERNETES cluster. In an example, the metrics are kube metrics that are provided by a service of a KUBERNETES cluster. In an example, the metrics correspond to multiple performance metric time series.

In an example, the performance metrics represent one or multiple characteristics of a top cluster layer of the container cluster. In an example, the performance metrics represent attributes, or characteristics, of a control plane of the container cluster. In an example, the performance metrics represent attributes, or characteristics, of nodes of the container cluster. In an example, the performance metrics represent attributes, or characteristics, associated with a pod of containers. In another example, the performance metrics represent attributes, or characteristics, associated with a program that is running inside a pod of a container.

The instructions 704, when executed by the machine, further cause the machine to determine first statistics for a given performance metric. In an example, the instructions 704 cause the machine to determine a mean, or average, of observed values of the given performance metric. In an example, the observed values are values over a moving, or sliding, time window. In an example, determining the first statistics for the given performance metric includes determining a standard deviation. In an example, determining the first statistics for the given performance metric includes the machine determining a residual of the given performance metric. In an example, determining the first statistics for the given performance metric includes decomposing observed values for the given performance metric into seasonal and residual component values. In an example, determining the first statistics for the given performance metric includes determining statistics for a residual component of the given performance metric after trend and seasonal components of the given performance metric are removed.

The instructions 704, when executed by the machine, further cause the machine to determine a test statistic for the given performance metric based on the statistics. The test statistic is associated with a given snapshot, and the given snapshot is associated with a given sampling time. In an example, the test statistic may be a Grubbs' test statistic. In another example, the test statistic may be a z-score test statistic. In another example, the test statistic may be an ESD test statistic. In another example, the test statistic may be an S-ESD test statistic. In another example, the test statistic may be an S-H-ESD test statistic.

The instructions 704, when executed by the machine, further cause the machine to determine, based on the test statistic, that the value of the given performance metric is anomalous. The instructions 704, when executed by the machine, further cause the machine to, responsive to determining that the given performance metric is anomalous, select a subset of the plurality of performance metrics based on the given sampling time and determine features based on the subset. In an example, selecting the subset of performance metrics includes selecting performance metrics in a time range that begins before the time associated with the given performance metric and ends after the time associated with the given performance metric. In an example, the subset of performance metrics includes the performance metrics at the time associated with the given snapshot.

The instructions 704, when executed by the machine, further cause the machine to apply a machine learning classifier to the features to classify a security intrusion associated with the container environment. In an example, classifying the security intrusion includes applying a principal component analysis to the subset of performance metrics to identify principal components. In an example, the machine learning classifier corresponds to an ensemble learning-based classification algorithm. In an example, the machine learning classifier corresponds to a gradient boosting algorithm. In an example, the machine learning classifier is an XGBoost algorithm. In an example, classifying the security intrusion includes identifying a security tactic and one or multiple techniques to achieve the tactic. In an example, classifying the security intrusion includes identifying an intrusion that is recognized by the MITRE ATT&CK security database.

Referring to FIG. 8, in accordance with example implementations, a technique 800 includes monitoring (block 804), by a behavior classification engine, metrics that characterize a container environment. The metrics correspond to respective time series. The monitoring includes determining an unexpected value in a given time series.

In an example, the unexpected value is an anomaly, or outlier, in view of statistics of prior observed values of the given time series. In an example, the metrics are performance metrics of the container environment. In an example, the anomaly is due to a security intrusion associated with the container environment. In another example, the anomaly attributable to a configuration issue associated with the container environment, such as a configuration change, a code degradation or other configuration-affiliated reason. In an example, the container environment is an orchestrated container environment, a self-managed container environment, or a container environment that includes one or multiple scratch containers. In an example, the container environment is a KUBERNETES cluster.

The technique 800 includes, responsive to detecting the unexpected value, determining (block 808), by the behavior classification engine, a set of multi-dimensional points associated with a space. The space is associated with dimensions, and each dimension corresponds to a different metric. The technique 800 includes, responsive to detecting the unexpected value, identifying (block 808), by the behavior classification engine, subspaces of the space based on covariances of the metrics. In an example, identifying the subspaces includes identifying outliers of subspaces using subspace outlier detection (SOD). In an example, identifying the subspaces includes determining covariances among the dimensions of the multi-dimensional points.

The technique 800 includes, responsive to detecting the unexpected value and based on characteristic associated with the subspaces, determining (block 808), by the behavior engine, whether the unexpected value is attributable to a configuration issue that is associated with the container environment or a security intrusion of the container environment.

In an example, the determination of block 808 may include determining distances among the subspaces and classifying whether the unexpected value is attributable to a configuration issue or a security intrusion based on the distances. In another example, the determination may include determining a density of a subspace associated with the unexpected value and determining whether the unexpected value is attributable to a configuration issue or a security intrusion based on the density. In another example, the determination of block 808 may include determining covariances of the subspace associated with the unexpected value and determining whether the unexpected value is attributable to a configuration issue or a security intrusion based on the covariances.

In another example, the determination of block 808 may include determining a score based on characteristics of the subspaces and comparing the score to a threshold. In an example, determining the score may include determining a score based on a subspace density, subspace distances and subspace covariances. In an example, determining the score may include assigning weights to score components.

In accordance with example implementations, the security intrusion classification engine accesses multi-dimensional points. Each point of the multi-dimensional points corresponds to a time sample of the plurality of metrics at a different time. Each point of the multi-dimensional points includes elements corresponding to respective dimensions of the plurality of dimensions. The security intrusion classification engine determines covariances among the plurality of dimensions based on the multi-dimensional points, and based on the covariances, identifies principal components of the plurality of metrics. The security intrusion classification engine determines the feature vectors based on the principal components. Among the particular advantages, security intrusions are identified in real time or near real time, and a rate of falsely-classified security intrusions is reduced.

In accordance with example implementations, the security intrusion classification engine, responsive to the determination that the anomalous variation is attributable to the security intrusion, associate the security intrusion with a security attack classification identified by a security intrusion database. Among the particular advantages, security intrusions are identified in real time or near real time, and the rate or number of falsely-classified security intrusions is reduced.

In accordance with example implementations, the machine learning classifier may be an XGBoost classifier. Among the particular advantages, security intrusions are identified in real time or near real time, and the rate or number of falsely-classified security intrusions is reduced.

In accordance with example implementations, the anomaly detection engine to further apply a statistical test to the given metric and detect the anomalous variation responsive to a result of the statistical test. Among the particular advantages, security intrusions are identified in real time or near real time, and the rate or number of falsely-classified security intrusions is reduced.

In accordance with example implementations, the anomaly detection engine to further determine a statistic for the given metric based on time samples of prior values of the given metric and determine a comparison threshold based on the statistic. The anomaly detection engine to further compare a current value of the given metric to the comparison threshold and detect the anomalous variation based on a result of the comparison. Among the particular advantages, security intrusions are identified in real time or near real time, and the rate or number of falsely-classified security intrusions is reduced.

In accordance with example implementations, the anomaly detection engine to further access a time series of samples of the given metric and decompose the time series. The decomposition providing a residual component of the time series and a seasonal component of the time series. The anomaly detection engine to further statistically test the residual component and detect the anomalous variation based on a result of the statistical testing of the residual component. Among the particular advantages, security intrusions are identified in real time or near real time, and the rate or number of falsely-classified security intrusions is reduced.

In accordance with example implementations, the plurality of metrics is associated with a vector space that has a plurality of dimensions. The behavioral anomaly detection engine to further identify a subspace of the vector space associated with the anomalous variation and determine whether the anomalous variation is attributable to the security intrusion or the behavioral anomaly based on a characteristic of the subspace. Among the particular advantages, security intrusions are identified in real time or near real time, and the rate or number of falsely-classified security intrusions is reduced.

In accordance with example implementations, the behavioral anomaly detection engine to further determine dimensional covariances within the subspace and determine whether the anomalous variation is attributable to the security intrusion or the behavioral anomaly based on the covariances. Among the particular advantages, security intrusions are identified in real time or near real time, and the rate or number of falsely-classified security intrusions is reduced.

In accordance with example implementations, the plurality of metrics is associated with a vector space having the plurality of dimensions. The behavioral anomaly detection engine to further determine dimensional covariances of the plurality of metrics, determine subspaces of the vector space based on the dimensional covariances and determine distances among the subspaces. The behavioral anomaly detection engine to further determine whether the anomalous variation is attributable to the security intrusion or the behavioral anomaly based on the distances. Among the particular advantages, security intrusions are identified in real time or near real time, and the rate or number of falsely-classified security intrusions is reduced.

In accordance with example implementations, the behavioral anomaly detection engine determines the anomalous variation is attributable to the behavioral anomaly, and the behavioral anomaly is associated with a configuration issue with the container environment. Among the particular advantages, security intrusions are identified in real time or near real time, and the rate or number of falsely-classified security intrusions is reduced.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:

an anomaly detection engine comprising a hardware processor to monitor a plurality of metrics associated with a container cluster to detect an anomalous variation of a given metric of the plurality of metrics, wherein the plurality of metrics is associated with a plurality of dimensions;

a behavior classification engine comprising a hardware processor to, responsive to the detection of the anomalous variation, determine whether the anomalous variation is attributable to a security intrusion or a behavioral anomaly; and a security intrusion classification engine comprising a hardware processor to, responsive to the determination that the anomalous variation is attributable to the security intrusion:

determine feature vectors based on the plurality of metrics; and apply a machine learning classifier to the feature vectors to classify the security intrusion.

2. The apparatus of claim 1, wherein the security intrusion classification engine to further:

access multi-dimensional points, wherein each point of the multidimensional points corresponds to a time sample of the plurality of metrics at a different time, and each point of the multi-dimensional points comprises elements corresponding to respective dimensions of the plurality of dimensions;

determine covariances among the plurality of dimensions based on the multi-dimensional points;

based on the covariances, identify principal components of the plurality of metrics; and determine the feature vectors based on the principal components.

3. The apparatus of claim 1, wherein the security intrusion classification engine to further, responsive to the determination that the anomalous variation is attributable to the security intrusion, associate the security intrusion with a security attack classification identified by a security intrusion database.

4. The apparatus of claim 1, wherein the machine learning classifier comprises an extreme gradient boost (XGBoost) classifier.

5. The apparatus of claim 1, wherein the anomaly detection engine to further apply a statistical test to the given metric and detect the anomalous variation responsive to a result of the statistical test.

6. The apparatus of claim 1, wherein the anomaly detection engine to further:

determine a statistic for the given metric based on time samples of prior values of the given metric;

determine a comparison threshold based on the statistic;

compare a current value of the given metric to the comparison threshold; and detect the anomalous variation based on a result of the comparison.

7. The apparatus of claim 1, wherein the anomaly detection engine to further:

access a time series of samples of the given metric;

decompose the time series, the decomposition providing a residual component of the time series and a seasonal component of the time series;

statistically test the residual component; and detect the anomalous variation based on a result of the statistical testing of the residual component.

8. The apparatus of claim 1, wherein:

the plurality of metrics is associated with a vector space having the plurality of dimensions; and a behavioral anomaly detection engine to further:

identify a subspace of the vector space associated with the anomalous variation; and determine whether the anomalous variation is attributable to the security intrusion or the behavioral anomaly based on a characteristic of the subspace.

9. The apparatus of claim 8, wherein:

the behavioral anomaly detection engine to further determine dimensional covariances within the subspace; and determine whether the anomalous variation is attributable to the security intrusion or the behavioral anomaly based on the covariances.

10. The apparatus of claim 1, wherein:

the plurality of metrics is associated with a vector space having the plurality of dimensions; and a behavioral anomaly detection engine to further:

determine dimensional covariances of the plurality of metrics;

determine subspaces of the vector space based on the dimensional covariances;

determine distances among the subspaces; and determine whether the anomalous variation is attributable to the security intrusion or the behavioral anomaly based on the distances.

11. The apparatus of claim 1, wherein:

a behavioral anomaly detection engine determines the anomalous variation is attributable to the behavioral anomaly; and the behavior anomaly is associated with a configuration issue with the container environment.

12. A non-transitory storage medium that stores machine-readable instructions that, when executed by a machine, cause the machine to:

access performance metrics time series data representing snapshots of a plurality of performance metrics for a container environment, wherein the snapshots are associated with respective sampling times;

determine first statistics for a given performance metric of the plurality of performance metrics;

determine a test statistic for the given performance metric based on the first statistics, wherein the test statistic is associated with a given snapshot of the snapshots, and wherein the given snapshot is associated with a given sampling time of the sampling times;

determine, based on the test statistic, that a value of the given performance metric is anomalous;

responsive to determining the given performance metric is anomalous:

select a subset of the plurality of performance metrics based on the given sampling time; and determine features based on the subset of the plurality of performance metrics; and apply a machine learning classifier to the features to classify a security intrusion associated with the container environment.

13. The storage medium of claim 12, wherein the instructions, when executed by the machine, further cause the machine to:

remove a seasonal component of the given performance metric to provide a residual component of the given performance metric; and determine the first statistics based on the residual component.

14. The storage medium of claim 12, wherein:

the first statistics comprise a mean and a standard deviation of observed time series values of the given performance metric; and the instructions, when executed by the machine, further cause the machine to determine the test statistic based on the mean and the standard deviation.

15. The storage medium of claim 12, wherein:

the first statistics comprise a median and a median absolute deviation of observed time series values of the given performance metric; and the instructions, when executed by the machine, further cause the machine to determine the test statistic based on the median and the median absolute deviation.

16. A method comprising:

monitoring, by a behavior classification engine, metrics characterizing a container environment, wherein the metrics correspond to respective time series, and the monitoring comprises detecting an unexpected value in a given time series of the time series; and responsive to detecting the unexpected value:

determining, by the behavior classification engine, a set of multi-dimensional points associated with a space, wherein the space is associated with dimensions, and each dimension corresponds to a different metric of the metrics;

identifying, by the behavior classification engine, subspaces of the space based on covariances of the metrics; and based on characteristics associated with the subspaces, determining, by the behavior classification engine, whether the unexpected value is attributable to a configuration issue associated with the container environment or a security intrusion of the container environment.

17. The method of claim 16, wherein determining whether the unexpected value is attributable to a configuration issue associated with the container environment or a security intrusion of the container environment comprises:

determining distances among the subspaces; and determining that the container environment is associated with a security intrusion based on a distance of the distances exceeding a distance threshold, determining that the unexpected value is associated with a security intrusion of the container environment.

18. The method of claim 16, wherein:

a given subspace of the subspaces is associated with the unexpected value; and determining whether the container environment is associated with the behavior anomaly or the security intrusion comprises:

determining first metric covariances based on points of the multi-dimensional points located in the given subspace;

comparing the first metric covariances to historical metric covariances; and determining that the container environment is associated with a behavior anomaly based on a first subset of the first metric covariances corresponding to some metric covariances of the historical metric covariances and a second subset of the first metric covariances not corresponding to other metric covariances of the historical metric covariances.

19. The method of claim 16, further comprising:

responsive to determining that the container is associated with the security intrusion, applying machine learning to at least some of the metrics to classify the security intrusion.

20. The method of claim 16, wherein the container environment comprises a container cluster, and the metrics comprise performance metrics provided by the container cluster.

* * * * *